(12) United States Patent
Corrao et al.

(10) Patent No.: US 8,126,988 B2
(45) Date of Patent: Feb. 28, 2012

(54) PUBLIC STATUS DETERMINATION AND SECURITY CONFIGURATION OF A BROWSER

(75) Inventors: Ann Mead Corrao, Raleigh, NC (US); Brian Marshall O'Connell, Cary, NC (US); Brian James Snitzer, Lancaster, PA (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 11/876,275

(22) Filed: Oct. 22, 2007

(65) Prior Publication Data

US 2009/0106664 A1   Apr. 23, 2009

(51) Int. Cl.
*G06F 15/16* (2006.01)
(52) U.S. Cl. ......... 709/218; 709/224; 709/227; 709/228
(58) Field of Classification Search ................. 709/218, 709/224, 217, 227, 228
See application file for complete search history.

(56) References Cited

U.S. PATENT DOCUMENTS 5,884,031 A   3/1999   Ice
(Continued)

OTHER PUBLICATIONS

USPTO Office Action regarding U.S. Appl. No. 11/876,275, dated Apr. 19, 2011.

*Primary Examiner* — Djenane Bayard
(74) *Attorney, Agent, or Firm* — Yee & Associates, P.C.; Mark C. Vallone

(57) ABSTRACT

The illustrative embodiments described herein provide a computer implemented method, apparatus, and computer program product for dynamically identifying a publicly accessed system. A plurality of user profiles is generated for a plurality of users associated with a browser on a system. A set of unique user profiles is identified in the plurality of user profiles. The number of users associated with the set of unique user profiles is compared to a preconfigured threshold. Responsive to the number of users exceeding the preconfigured threshold, the system is identified as a publicly accessed system.

18 Claims, 5 Drawing Sheets

U.S. PATENT DOCUMENTS

| | | |
|---|---|---|
| 6,081,899 A | 6/2000 | Byrd |
| 6,799,198 B1 | 9/2004 | Huboi et al. |
| 7,047,369 B1 | 5/2006 | Gruper et al. |
| 7,685,254 B2 | 3/2010 | Pandya |
| 7,810,149 B2 | 10/2010 | Islam et al. |
| 7,818,206 B2 * | 10/2010 | Smith et al. .................. 705/14.1 |
| 2003/0074552 A1 | 4/2003 | Olkin et al. |
| 2003/0097561 A1 | 5/2003 | Wheeler et al. |
| 2004/0053619 A1 * | 3/2004 | Kim et al. ..................... 455/445 |
| 2005/0166065 A1 * | 7/2005 | Eytchison et al. ............ 713/189 |
| 2007/0016954 A1 | 1/2007 | Choi et al. |
| 2007/0214272 A1 * | 9/2007 | Isaacson ....................... 709/229 |
| 2009/0077383 A1 * | 3/2009 | de Monseignat et al. ..... 713/175 |
| 2009/0106835 A1 | 4/2009 | Corrao et al. |

* cited by examiner

US 8,126,988 B2

PUBLIC STATUS DETERMINATION AND SECURITY CONFIGURATION OF A BROWSER

CROSS REFERENCE TO RELATED APPLICATION

The present invention is related to the following patent application: entitled "Method and Apparatus for Protecting Sensitive Information on a Publicly Accessed Data Processing System", Ser. No. 11/876,248, status co-pending; filed even date hereof, assigned to the same assignee, and incorporated herein by reference.

BACKGROUND OF THE INVENTION

1. Field of the Invention

The present invention relates generally to an improved data processing system and method for dynamically adjusting the security settings on a computer. Still more particularly, the present invention relates to a computer implemented method, apparatus, and computer program product for dynamically determining that a system is publicly accessed and adjusting the security configuration of the system based on the public use status.

2. Description of the Related Art

One model of web browsing, termed public web browsing, exists in which users are allowed to use computers that access the Internet via a web browser in a public setting. Such systems commonly exist in places, such as, libraries, coffee houses, internet cafes, and car dealerships. Users of public systems often perform common tasks such as general web surfing, updating blogs, composing email, ordering merchandise, and accessing on-line banking. Unfortunately, many users are unaware of the potential security risks that exist from exposing discoverable private data on a public computer system. For example, some websites may allow users to save private data to the system using known technologies such as cookies. The cookie data or other data stored within the web browser can potentially allow subsequent malicious users access to private information that may be used for fraudulent or criminal purposes. Similarly, many browsers allow data from forms, including passwords, to be stored, and in some cases without prompting the user.

Most browsers, by default, are optimized for private usage due to the increased usability provided, thus, most browsers are set to store private information. Current web browsing applications provide security settings to address the above problems, but they require the user to be familiar with the location of these settings within the application and understand each setting's effect. As a manual process, configuring the security settings is prone to errors and even omission of the entire process.

SUMMARY OF THE INVENTION

The illustrative embodiments described herein provide a computer implemented method, apparatus, and computer program product for dynamically identifying a publicly accessed system. A plurality of user profiles is generated for a plurality of users associated with a browser on a system. A set of unique user profiles is identified in the plurality of user profiles. The number of users associated with the set of unique user profiles is compared to a preconfigured threshold. Responsive to the number of users exceeding the preconfigured threshold, the system is identified as a publicly accessed system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart illustrating a process for modifying the security and privacy configuration of a publicly accessed system by a server.

DETAILED DESCRIPTION OF THE PREFERRED EMBODIMENT

Figure 1:
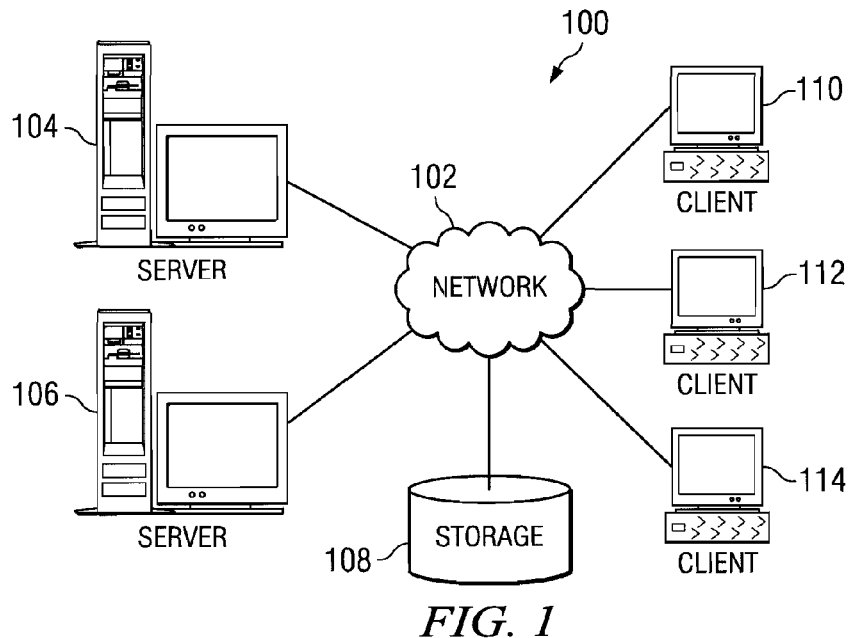
FIG. 1 is a pictorial representation of a network of data processing systems in which illustrative embodiments may be implemented.
Figure 2:
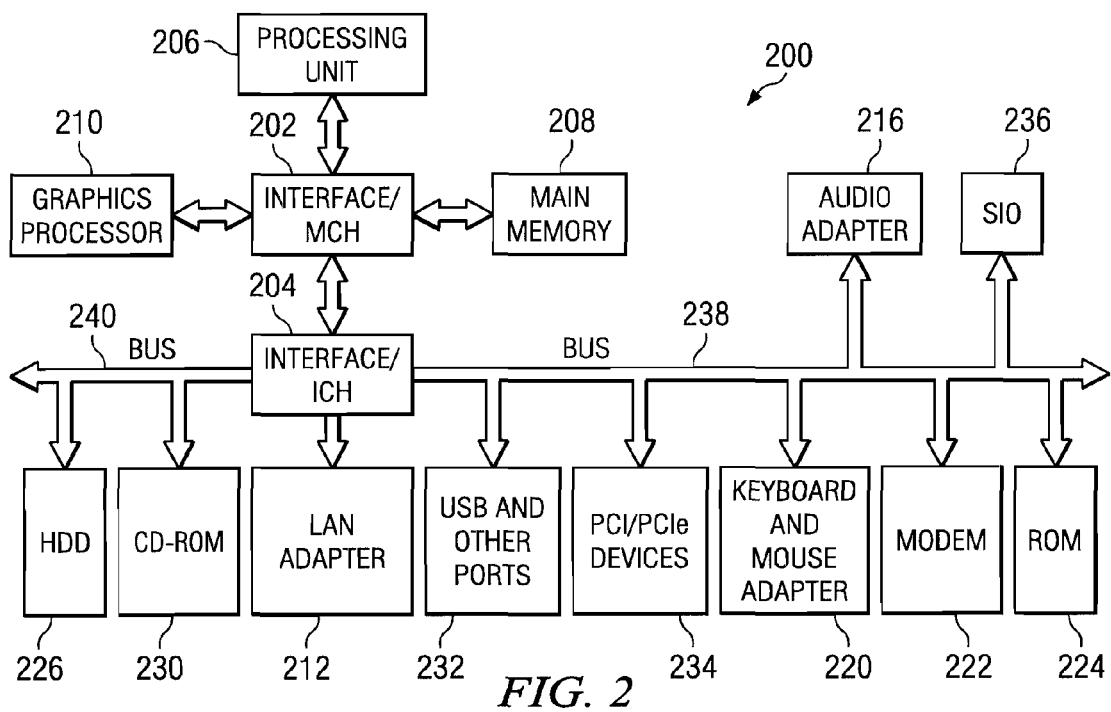
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

The illustrative embodiments may be implemented in a data processing system, such as clients 110, 112, and 114. Clients 110, 112, and 114 may use an Internet browser to communicate with server 104. Network data processing system 100 may include additional servers, clients, and other devices not shown.

Network 102 may be, without limitation, a local area network (LAN), wide area network (WAN), Internet, Ethernet, or Intranet. In this example, network 102 is the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as directory server 104 as shown in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments enable the automatic detection of a publicly accessed system and the automatic configuration of the browser's security and privacy settings. A plurality of user profiles is generated for a plurality of users associated with a browser on a system. A set of unique user profiles is identified in the plurality of user profiles.

The set of unique user profiles may consist of one or more unique user profiles, in these examples. A unique user profile is a user profile into which the data elements of the user profile does not exactly match or statistically match another user profile. A user profile statistically matches another user profile if the number of matching data elements of the user profiles exceeds a preconfigured threshold. The number of users associated with the set of unique user profiles is compared to a preconfigured threshold. Responsive to the number of users exceeding the preconfigured threshold, the system is identified as a publicly accessed system and the system's status is set to public. The browser's security and privacy settings are then modified based on a set of preconfigured parameters.

A publicly accessed system is defined as a system that is available to a public, such as in a public location (i.e., a library), and not in the physical control of one person or a few trusted individuals (a family). A private system is defined as a system that is in the physical control of one individual or several trusted individuals (i.e., a shared family computer).

Figure 3:
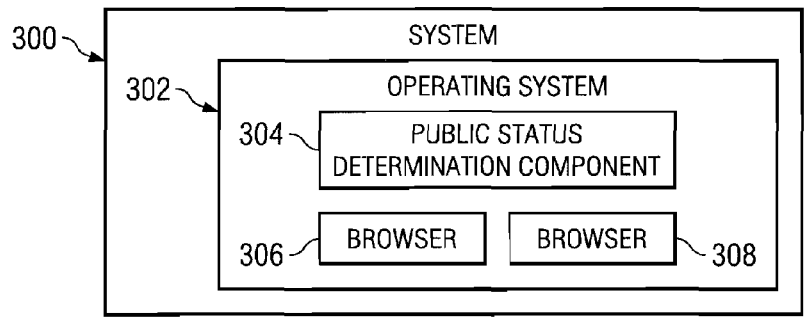
FIG. 3 is a block diagram depicting a data processing environment in which illustrative embodiments may be implemented.

FIG. 3 is a block diagram depicting a data processing environment in which illustrative embodiments may be implemented. System 300 may be implemented in a data processing system, such as a client 110 shown in FIG. 1, or data processing system 200 shown in FIG. 2.

Operating system 302 runs on system 300. Operating system 302 may be a commercially available operating system such as, but not limited to, Microsoft Windows® XP. The illustrative embodiments may be implemented in a public status determination component, such as public status determination component 304. Browser 306 and browser 308 are Internet browsers running on system 300. Browser 306 and browser 308 may be any commercially available browsers, including but not limited to, Microsoft® Internet Explorer®, Mozilla® Firefox®, and Apple® Safari®.

Figure 4:
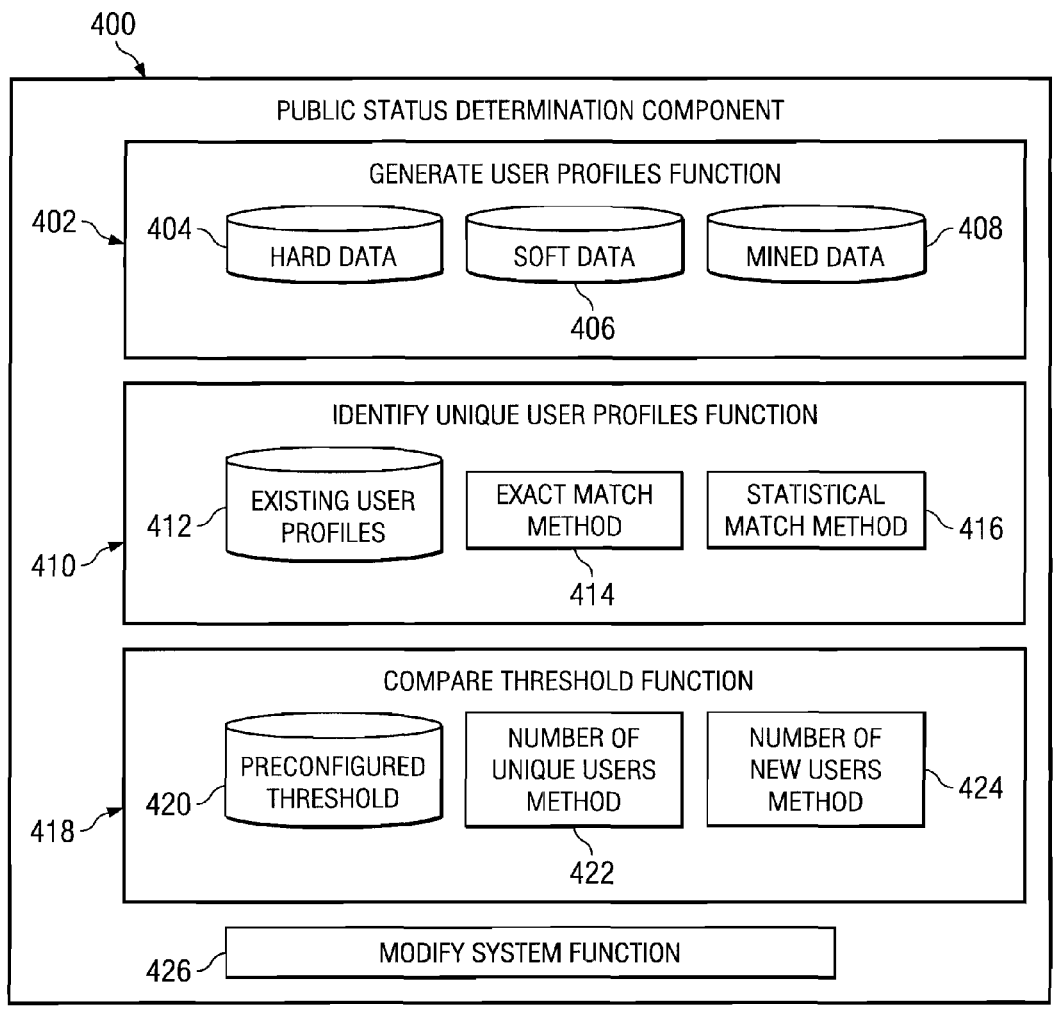
FIG. 4 is a block diagram of a public status determination component in which illustrative embodiments may be implemented.

FIG. 4 is a block diagram of a public status determination component in which illustrative embodiments may be implemented. Public status determination component 400, may be implemented in public status determination component 304 as shown in FIG. 3. Public status determination component 400 depicts the functional components of a public status determination component in which illustrative embodiments may be implemented.

Public status determination component 400 contains a generate user profiles function 402. Generate user profiles function 402 analyzes user's behavior to develop three types of identifying user profiles. The first type of identifying user profile data is hard data 404. Hard data 404 is generated from specific information that the user passes on to the system. The specific information includes usernames for well known services, such as, but not limited to, Google® Gmail®, Yahoo® Instant® Messenger accounts, and other identifying data. Google® Gmail® is an electronic mail system provided by Google, Inc. Yahoo® Instant Messenger is provided by Yahoo!, Inc. The user enters this information into a browser on the system. The specific information is then collected by public status determination component 400 and stored as a user profile.

The second type of identifying user profile data is soft data 406. Soft data 406 is created by analyzing stored metrics associated with users' physical interaction with the system. Such metrics include, but are not limited to, keyboard usage, typing speed, click times, and other identifying patterns distinguishing one user from another.

The third type of identifying user profile data is mined data 408. Mined data 408 is developed by mining the content that users enter into a browser of the system. Such content includes, but is not limited to, search engine queries, e-mail content, chat room and instant messaging entries, and a history of the web pages that were browsed. For example, a profile could be developed based upon the frequency of specific words or the presence of certain identifying content characteristics, such as a misspelled word or an often repeated phrase.

Additionally, public status determination component 400 contains an identify unique user profiles function 410. Identify unique user profiles function 410 determines whether the generated user profiles developed by generate user profiles function 402 are already known in a data store of existing user profiles 412. New user profiles are both compared against user profiles contained in data store of existing user profiles 412 and then inserted into data store of existing user profiles 412 responsive to a determination that the new user profile is a unique user profile. This determination is accomplished through two methods, exact match method 414 and statistical match method 416.

Exact match method 414 performs a direct comparison between the data elements of a profile and the data elements of existing profiles to determine exact matching user profiles. Exact match method 414 is particularly successful using hard data 404. A match at this level can clearly identify that the user profile is of a person previously known, although a failure to achieve an exact match cannot guarantee that the user profile is not of a person already known. If this method does not produce an exact match, then statistical match method 416 may be invoked.

Statistical match method 416 also performs a direct comparison between the data elements of a profile and the data elements of existing profiles. However, statistical match method 416 tracks the percentage of similarity that exists between the data elements of a new user profile and the data elements of existing user profiles. For example, profiles having an 80 percent match in content, or that represent a match in statistically unlikely phrases, might be more likely to represent a known user profile. A profile deemed to belong to an existing user will be associated with that user, thus increasing the likelihood of identifying that user in the future. Similarly, profiles that have a 20 percent match in content are more likely to represent a unique user profile. The percentage of a match that indicates a unique user profile can be configured to make the system either more or less likely to differentiate between users.

Public status determination component 400 also contains a compare threshold function 418. Compare threshold function 418 may use two different methods, number of unique users method 422 and number of new users method 424, to determine whether a system is publicly accessed.

Number of unique users method 422 compares the number of unique user profiles contained in a data store of existing user profiles 412 against a pre-configured threshold 420 stored as a local data store. A pre-configured threshold is a value predetermined by a developer or administrator indicating a system is publicly accessed. For example, a developer or administrator might determine that more than five users represent a publicly accessed system.

Number of new users method 424 compares the ratio of new user profiles added to the existing user profiles in the data store of existing user profiles 412 against a pre-configured threshold 420 stored as a local data store. Number of new users method 424 allows for the identification of a system that is publicly accessed even with low volume users, where the presence of new user profiles is the indicator of a publicly accessed system.

Public status determination component 400 further comprises a modify system function 426. Modify system function 426 modifies the web browsers security and privacy configurations responsive to a determination that a system is publicly accessed. For example, but without limitations, the following specific configuration modifications may be implemented: (1) send with each request a "Public-Computer: True" HTTP header, or some other header, indicating to services the computer is public and the appropriate server side methods may be invoked to protect a user's security and privacy; (2) have the browser automatically uncheck or hide "remember me/remember login" option for remembering usernames and passwords; (3) warn user if user selects "remember me" option for remembering usernames and passwords; (4) have browser automatically eject cookies after a short duration; (5) standardized hidden field indicating use of a public computer and transmitted on any Hypertext Markup Language (HTML) submit action; and (6) do not allow form data to be saved for later use. Similarly, if a system is determined to be private, the same modifications can be explicitly removed.

Figure 5:
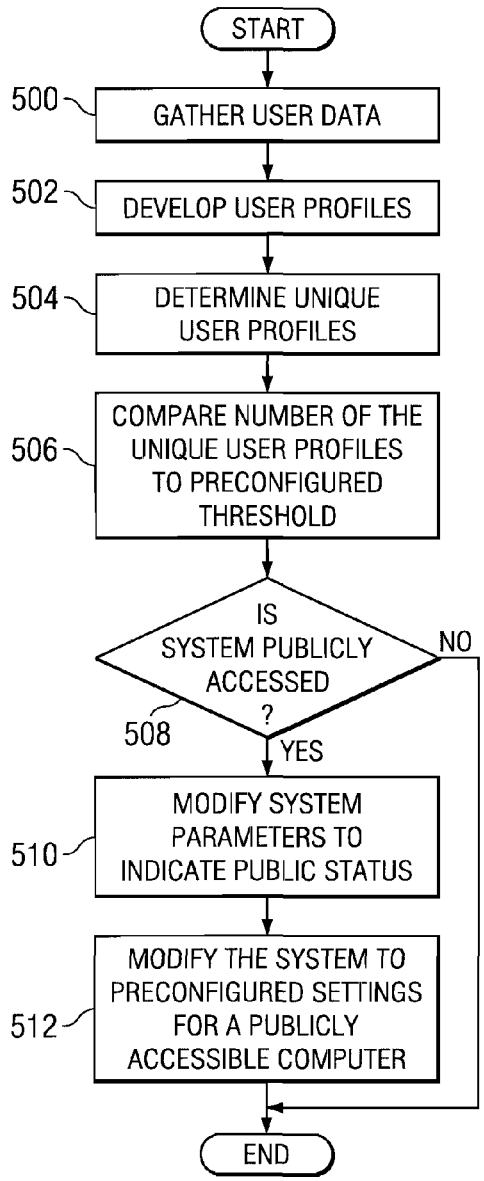
FIG. 5 is a flowchart illustrating a process for dynamically determining that a system is publicly accessed and adjusting the security configuration of the system in accordance with an illustrative embodiment.

With reference now to FIG. 5, a flowchart illustrating a process for dynamically determining that a system is publicly accessed and adjusting the security configuration of the system based on a public use status in accordance with an illustrative embodiment is depicted. The process in FIG. 5 is implemented by a public status determination component, such as public status determination component 400 in FIG. 4.

The process begins by gathering the user data (step 500). The user data may consist of, but is not limited to, hard data generated from specific information the user passes on to the system, soft data created by analyzing users' behavioral usage patterns while interacting with the system, and mined data developed by mining the content that users enter into a browser of the system. User profiles are developed from the user data (step 502).

The process compares the user profiles against user profiles contained in a data store of existing user profiles. If the user profile is determined to be a unique user profile, then the user profile is inserted into the data store of existing user profiles (step 504). The number of unique user profiles is then compared to a preconfigured threshold (step 506). Based on the method used, such as, but without limitations, number of unique users method 422 or number of new users method 424 as shown in FIG. 4, a determination is made as to whether the system is publicly accessed (step 508). If the system is not publicly accessed, the process ends. If at step 508, a determination is made that the system is publicly accessed, then the process modifies a system parameter to indicate that the system is a publicly accessed system (step 510). Additionally, the process modifies the system's security and privacy settings to a preconfigured setting for a publicly accessed system (step 512) with the process terminating thereafter.

Figure 6:
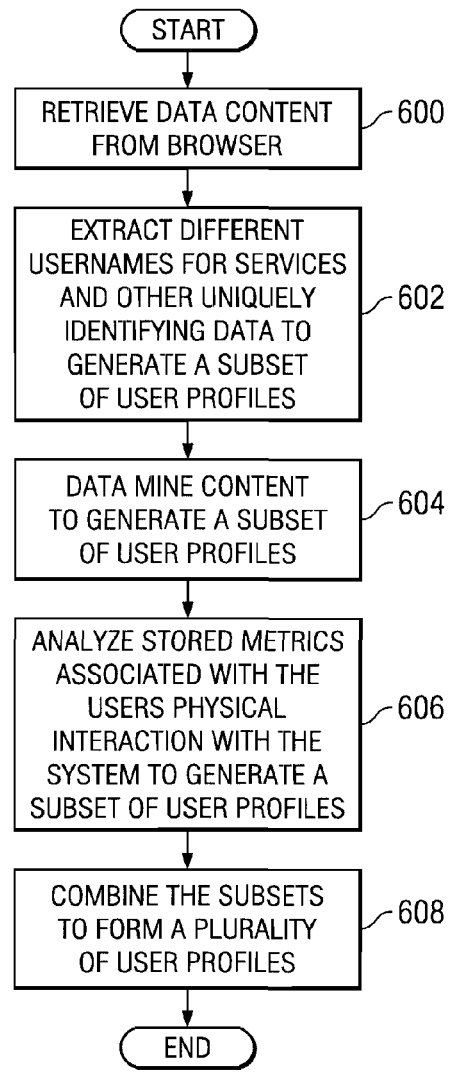
FIG. 6 is a flowchart illustrating a process for generating a plurality of user profiles in accordance with an illustrative embodiment.

FIG. 6 is a flowchart illustrating a process for generating a plurality of user profiles in accordance with an illustrative embodiment. The process in FIG. 6 is implemented by a public status determination component, such as public status determination component 400 in FIG. 4.

The process begins by retrieving the user data from the browser(s) and the system (step 600). The process then extracts unique usernames and other uniquely identifying data from services to generate a subset of user profiles (step 602). Such services may include, but are not limited to, e-mail accounts, instant messenger usernames, and other web services requiring a user to generate a username. Additionally, the process mines the user data to generate another subset of user profiles (step 604). For example, mined data may consist of statistically unlikely phrases that may indicate a unique user profile.

Furthermore, the stored metrics associated with users' physical interaction with the system is analyzed to generate another subset of user profiles (step 606). For instance, a subset of user profiles maybe generated based upon users typing speed. The subsets of user profiles generated at steps 602, 604, and 606 are combined to form a plurality of user profiles (step 608), with the process terminating thereafter.

Figure 7:
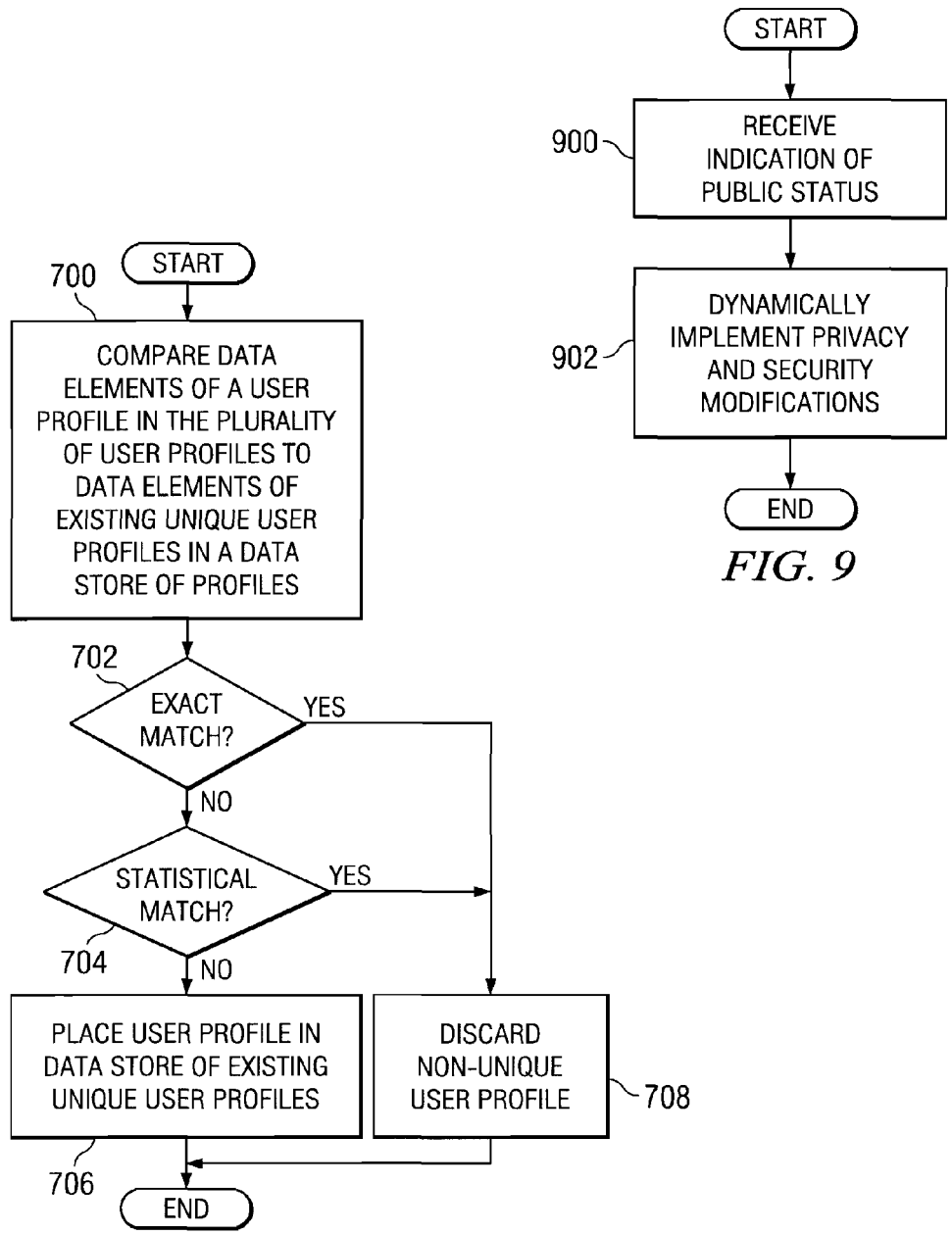
FIG. 7 is a flowchart illustrating a process for identifying a set of unique user profiles in accordance with an illustrative embodiment.

FIG. 7 is a flowchart illustrating a process for identifying a set of unique user profiles in accordance with an illustrative embodiment. The process in FIG. 7 is implemented by a public status determination component, such as public status determination component 400 in FIG. 4.

The process begins by comparing the data elements of a user profile in the user profiles, generated at steps 608 as shown in FIG. 6, to data elements of existing unique user profiles stored in a data store (step 700). A determination is made as to whether the data elements of the user profile in the plurality of user profiles exactly matches the data elements of an existing unique user profile stored in the data store (step 702). If an exact match between the data elements of the user profile is present with the data elements of an existing unique user profile stored in the data store, the process designates the user profile as a non-unique user profile and discards the non-unique user profile from the user profiles (step 708) with the process terminating thereafter.

If at step 702 an exact match is not present, the process determines whether the data elements of the user profile statistically match the data elements of an existing unique user profile stored in the data store (step 704). The percentage of match that indicates a statistical match can be configured to make the system either more or less likely to differentiate between users.

If neither an exact match nor a statistical match is present between the data elements of the user profile in the plurality of user profiles to the data elements of an existing unique user profile stored in the data store, the user profile in the plurality of user profiles is inserted into the data store of unique user profiles (step 706), with the process terminating thereafter. If a statistical match between the data elements of the user profile is present with the data elements of an existing unique user profile stored in the data store, the process designates the user profile as a non-unique user profile and discards the non-unique user profile from the user profiles (step 708) with the process terminating thereafter.

Figure 8:
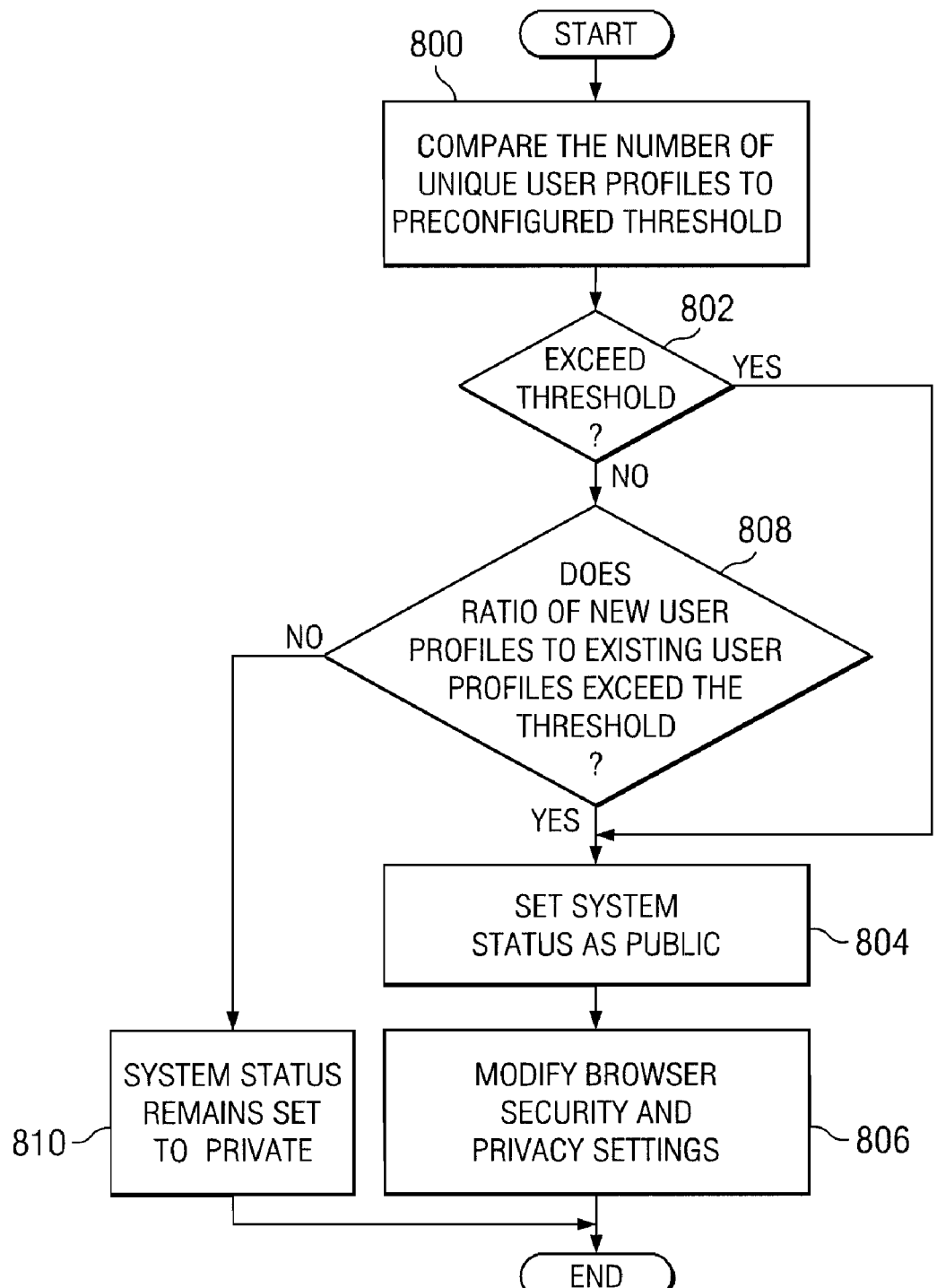
FIG. 8 is a flowchart illustrating a process for determining that a system is publicly accessed and modifying the browser's security and privacy settings in accordance with an illustrative embodiment.

With reference now to FIG. 8, a flowchart illustrating a process for determining that a system is publicly accessed and modifying the browser's security and privacy settings in accordance with an illustrative embodiment is depicted. The process in FIG. 8 is implemented by a public status determination component, such as public status determination component 400 in FIG. 4.

The process begins by comparing the number of unique user profiles in a data store of unique user profiles to a preconfigured threshold (step 800). A determination is made as to whether the number of unique user profiles exceeds the threshold (step 802). If the threshold is not exceeded, a determination is made as to whether the ratio of new user profiles to existing user profiles exceeds a threshold (step 808). If at step 802 or at step 808, the threshold is exceeded, the process sets a system status to public (step 804). If the threshold is not exceeded, the process sets the system status to private or the process maintains the system status as private (step 810), with the process terminating thereafter. After setting the system status as public in step 804, the process modifies the system browser(s)'s security and privacy settings to preconfigured parameters (step 806), with the process terminating thereafter.

FIG. 9 depicts a flowchart illustrating a server-side process for modifying the security and privacy configuration of a publicly accessed system. The process in FIG. 9 may be implemented in a data processing system, such as server 104 in FIG. 1.

The process begins by receiving an indication from a data processing system that the data processing system is a publicly accessed system (step 900). The indication may come in the form of an Hypertext Transfer Protocol (HTTP) header indicating to services that the system is a publicly accessed system, such as, but not limited to, "Public-Computer: True". An indication may also be in the form of a hidden file submitted from a Hypertext Markup Language (HTML) form identifying a system as public. Furthermore, the web services may query the browser to identify whether it is being used on a publicly accessed system.

Once a web server or web application server becomes aware that a user is originating from a publicly accessed system, the web server dynamically implements privacy and security modifications (step 902) with the process terminating thereafter. The server side modifications may include, but are not limited to, removing any "remember me/remember login" options from forms, changing permanent cookies to short duration temporary cookies, and reducing timeouts that allow a user to remain logged in without resubmitting a password. Additionally, the server may modify the security and privacy settings of the browser(s) on the publicly accessed system.

Thus, the illustrative embodiments described herein enable the automatic detection of a publicly accessed system and the automatic configuration of the browser's security and privacy settings based upon a determination that the system is being accessed publicly. A plurality of user profiles is generated for a plurality of users associated with a browser on a system. A set of unique user profiles is identified in the plurality of user profiles. The number of users associated with the set of unique user profiles is compared to a preconfigured threshold. Responsive to the number of users exceeding the preconfigured threshold, the system is identified as a publicly accessed system. The browser's security and privacy settings are then modified based on a set of preconfigured parameters. The process discloses new techniques such as, but not limited to, application of statistical methods to determine if a computer is publicly accessed, a new Hypertext Transfer Protocol (HTTP) header indicating to services that the system is a publicly used system, modification of site navigation and rendering to enhance security, and expedited cookie expiration.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable device providing program instructions for use by or in connection with a computer or any instruction execution system. For the purposes of this description, a computer-usable or computer-readable device can be any tangible apparatus that can store the program for use by or in connection with the instruction execution system, apparatus, or device.

The computer-readable device can be an electronic, magnetic, optical, or semiconductor system (or apparatus or device). Examples of a computer-readable device include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamically identifying a publicly accessed computer, the method comprising the steps of:
   a computer generating a number of user profiles for a plurality of users associated with a browser on the computer;
   the computer identifying a number of unique user profiles in the number of user profiles for the plurality of users associated with the browser;
   the computer comparing the number of unique user profiles to a first preconfigured threshold;
   the computer determining whether the number of unique user profiles exceeds the first preconfigured threshold;
   the computer, responsive to a determination that the number of unique user profiles does not exceed the first preconfigured threshold, determining whether a ratio of new user profiles to existing user profiles associated with the browser exceeds a second preconfigured threshold; and
   the computer, responsive to a determination that the ratio of new user profiles to existing user profiles associated with the browser exceeds the second preconfigured threshold, identifying the computer as a publicly accessed computer.

2. The method of claim 1 wherein the step of the computer identifying a number of unique user profiles in the number of user profiles for the plurality of users associated with the browser comprises the step of:
   the computer combining the number of unique user profiles with a preexisting number of unique user profiles.

3. The method of claim 1, further comprising the step of:
   the computer, responsive to identifying the computer as a publicly accessed computer, modifying the computer to a preconfigured setting.

4. The method of claim 3, wherein the step of the computer modifying the computer to a preconfigured setting comprises the step of:
   the computer sending a hypertext transfer protocol header to web services requiring a username, the hypertext transfer protocol header indicating that the computer is publicly accessed.

5. The method of claim 1, wherein the step of the computer generating a number of user profiles for a plurality of users associated with a browser on the computer comprises the steps of:
   the computer identifying a first subset of user profiles associated with hard data comprising of specific information entered into the computer by users;
   the computer identifying a second subset of user profiles associated with soft data comprising of physical user interaction with the computer;

the computer identifying a third subset of user profiles associated with data mining content entered by users interacting with the computer; and the computer combining the first subset, the second subset, and the third subset to form the number of user profiles for the plurality of users associated with the browser.

6. The method of claim 5, wherein the specific information entered into the computer by the users includes usernames for web services requiring a username.

7. The method of claim 5, wherein the soft data includes data identifying a typing speed of the users.

8. The method of claim 1, wherein the step of the computer identifying a number of unique user profiles in the number of user profiles for the plurality of users associated with the browser comprises the steps of:

the computer comparing data elements of a first user profile within the number of user profiles with data elements of a second user profile within a preexisting set of unique user profiles; and the computer, responsive to a determination that a preconfigured threshold number of data elements of the first user profile that match data elements of the second user profile is not exceeded, identifying the first user profile as a unique user profile.

9. A computer program product for dynamically identifying a publicly accessed computer, the computer program product comprising:

one or more computer-readable tangible storage devices;

program instructions, stored on at least one of the one or more computer-readable tangible storage devices, to generate a number of user profiles for a plurality of users associated with a browser on a computer;

program instructions, stored on at least one of the one or more computer-readable tangible storage devices, to identify a number of unique user profiles in the number of user profiles for the plurality of users associated with the browser;

program instructions, stored on at least one of the one or more computer-readable tangible storage devices, to compare the number of unique user profiles to a first preconfigured threshold;

program instructions, stored on at least one of the one or more computer-readable tangible storage devices, to determine whether the number of unique user profiles exceeds the first preconfigured threshold;

program instructions, stored on at least one of the one or more computer-readable tangible storage devices, to determine whether a ratio of new user profiles to existing user profiles associated with the browser exceeds a second preconfigured threshold in response to a determination that the number of unique user profiles does not exceed the first preconfigured threshold; and program instructions, stored on at least one of the one or more computer-readable tangible storage devices, to identify the computer as a publicly accessed computer in response to a determination that the ratio of new user profiles to existing user profiles associated with the browser exceeds the second preconfigured threshold.

10. The computer program product of claim 9, wherein the program instructions to identify a number of unique user profiles in the number of user profiles for the plurality of users associated with the browser combine the number of unique user profiles with a preexisting number of unique user profiles.

11. The computer program product of claim 9, further comprising:

program instructions, stored on at least one of the one or more computer-readable tangible storage devices, to modify the computer to a preconfigured setting in response to identifying the computer as a publicly accessed computer.

12. The computer program product of claim 11, wherein the program instructions to modify the computer to the preconfigured setting send a hypertext transfer protocol header to web services requiring a username, the hypertext transfer protocol header indicating that the computer is publicly accessed.

13. The computer program product of claim 9, wherein the program instructions to generate a number of user profiles for a plurality of users associated with a browser on a computer:

identify a first subset of user profiles associated with hard data comprising of specific information entered into the computer by users;

identify a second subset of user profiles associated with soft data comprising of physical user interaction with the computer;

identify a third subset of user profiles associated with data mining content entered by users interacting with the computer; and combine the first subset, the second subset, and the third subset to form the number of user profiles for the plurality of users associated with the browser.

14. The computer program product of claim 13, wherein the specific information entered into the computer by the users includes usernames for web services requiring a username.

15. The computer program product of claim 13, wherein the soft data includes data identifying a typing speed of the users.

16. The computer program product of claim 9, wherein the program instructions to identify a number of unique user profiles in the number of user profiles for the plurality of users associated with the browser:

compare data elements of a first user profile within the number of user profiles with data elements of a second user profile within a preexisting set of unique user profiles; and identify the first user profile as a unique user profile in response to a determination that a preconfigured threshold number of data elements of the first user profile that match data elements of the second user profile is not exceeded.

17. A computer system for dynamically identifying a publicly accessed system, the computer system comprising:

one or more processors, one or more computer-readable memories and one or more computer-readable tangible storage devices;

program instructions, stored on at least one of the one or more computer-readable tangible storage devices for execution by at least one of the one or more processors via at least one of the one or more computer-readable memories, to generate a number of user profiles for a plurality of users associated with a browser on a computer;

program instructions, stored on at least one of the one or more computer-readable tangible storage devices for execution by at least one of the one or more processors via at least one of the one or more computer-readable memories, to identify a number of unique user profiles in the number of user profiles for the plurality of users associated with the browser;

program instructions, stored on at least one of the one or more computer-readable tangible storage devices for execution by at least one of the one or more processors via at least one of the one or more computer-readable memories, to compare the number of unique user profiles to a first preconfigured threshold;

program instructions, stored on at least one of the one or more computer-readable tangible storage devices for execution by at least one of the one or more processors via at least one of the one or more computer-readable memories, to determine whether the number of unique user profiles exceeds the first preconfigured threshold;

program instructions, stored on at least one of the one or more computer-readable tangible storage devices for execution by at least one of the one or more processors via at least one of the one or more computer-readable memories, to determine whether a ratio of new user profiles to existing user profiles associated with the browser exceeds a second preconfigured threshold in response to a determination that the number of unique user profiles does not exceed the first preconfigured threshold; and program instructions, stored on at least one of the one or more computer-readable tangible storage devices for execution by at least one of the one or more processors via at least one of the one or more computer-readable memories, to identify the computer as a publicly accessed computer in response to a determination that the ratio new user profiles to existing user profiles associated with the browser exceeds the second preconfigured threshold.

18. The computer system of claim 17, further comprising:

program instructions, stored on at least one of the one or more computer-readable tangible storage devices for execution by at least one of the one or more processors via at least one of the one or more computer-readable memories, to modify the computer to a preconfigured setting in response to identifying the computer as a publicly accessed computer.

* * * * *